US012686583B2

(12) United States Patent
Yanai et al.

(10) Patent No.: US 12,686,583 B2
(45) Date of Patent: Jul. 21, 2026

(54) PAPER SHEET STORAGE DEVICE

(71) Applicant: Glory Ltd., Himeji (JP)

(72) Inventors: Hiroyuki Yanai, Himeji (JP); Takeshi Yokawa, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/900,963

(22) Filed: Sep. 30, 2024

(65) Prior Publication Data

US 2025/0019195 A1 Jan. 16, 2025

Related U.S. Application Data

(63) Continuation of application No. 18/409,846, filed on Jan. 11, 2024, which is a continuation of application No. PCT/JP2022/027415, filed on Jul. 12, 2022.

(30) Foreign Application Priority Data

Jul. 14, 2021 (JP) ................................ 2021-116371

(51) Int. Cl.
*B65H 29/00* (2006.01)
*G07D 11/12* (2019.01)
*G07D 11/14* (2019.01)

(52) U.S. Cl.
CPC ........... *B65H 29/006* (2013.01); *G07D 11/12* (2019.01); *G07D 11/14* (2019.01); *B65H 2301/41912* (2013.01); *B65H 2402/31* (2013.01); *B65H 2402/441* (2013.01); *B65H 2601/321* (2013.01); *B65H 2701/1912* (2013.01); *G07D 2211/00* (2013.01)

(58) Field of Classification Search
CPC ........ B65H 29/006; B65H 2301/41912; B65H 2402/441; B65H 2601/321; B65H 2402/45
See application file for complete search history.

(56) References Cited

U.S. PATENT DOCUMENTS 4,249,552 A 2/1981 Margolin et al.
8,833,537 B2 * 9/2014 Kashiwabuchi ..... B65H 29/006 312/34.1

(Continued)

FOREIGN PATENT DOCUMENTS

CN 207182485 U 4/2018
EP 3623326 A1 3/2020

(Continued)

OTHER PUBLICATIONS

International Search Report and Written Opinion mailed on Sep. 20, 2022, received for PCT Application PCT/JP2022/027415, filed on Jul. 12, 2022, 9 pages.

*Primary Examiner* — Jeremy R Severson
(74) *Attorney, Agent, or Firm* — XSENSUS LLP

(57) ABSTRACT

A sheet storing device includes: a rotary drum; a tape that winds a sheet on the rotary drum; a guide that guides the tape and the sheet to be wound on the rotary drum; and a frame that accommodates the rotary drum and the guide. The frame includes a first frame and a second frame. The first frame and the second frame are connected movably relative to each other to change the frame between an open state and a closed state. The second frame supports the guide to cause at least a part of the guide to move relative to the second frame in a direction away from the second frame in the open state.

16 Claims, 9 Drawing Sheets

(56) References Cited

U.S. PATENT DOCUMENTS

| | | | | |
|---|---|---|---|---|
| 11,370,630 | B2 * | 6/2022 | Yokawa | B65H 1/00 |
| 11,851,299 | B2 * | 12/2023 | Yokawa | B65H 29/006 |
| 2012/0313493 | A1 | 12/2012 | Yokote | |
| 2013/0240321 | A1 | 9/2013 | Kashiwabuchi et al. | |
| 2020/0087094 | A1 | 3/2020 | Yokawa et al. | |

FOREIGN PATENT DOCUMENTS

| | | | |
|---|---|---|---|
| JP | 2012-256271 | A | 12/2012 |
| JP | 2016207029 | A | 12/2016 |
| JP | 2019-212054 | A | 12/2019 |
| JP | 2020-047258 | A | 3/2020 |
| KR | 20120135635 | A | 12/2012 |

* cited by examiner

PAPER SHEET STORAGE DEVICE

CROSS-REFERENCE TO RELATED APPLICATIONS

This application is a Continuation of U.S. patent application Ser. No. 18/409,846, filed on Jan. 11, 2024, which is a bypass continuation of International Patent Cooperation Treaty Application No. PCT/JP2022/027415 filed on Jul. 12, 2022, and claims priority to Japanese Patent Application No. 2021-116371 filed on Jul. 14, 2021, the entire disclosures of each are incorporated herein by reference.

BACKGROUND

A conventional sheet storing device includes a drum, a guide, and a frame. The drum winds up sheets. The guide guides the sheets to the drum. The guide constitutes a part of a transport path for transporting the sheets to the drum. The frame accommodates the drum and the guide. The frame includes a first frame part and a second frame part that move relative to each other. Once the first and second frame parts move relative to each other, the sheet storing device switches between a state in which the transport path of the sheets is closed and the sheets are transportable and a state in which the transport path is open.

SUMMARY

The technique disclosed herein relates to a sheet storing device. This sheet storing device includes: a rotary drum; a tape to be wound on an outer circumferential surface of the rotary drum so as to wrap a sheet around the rotary drum; a guide that guides the tape and the sheet to be wound on the rotary drum; and a frame that accommodates the rotary drum and the guide. The frame includes a first frame and a second frame, and the first frame and the second frame are connected movably relative to each other to change the frame between an open state and a closed state. The second frame supports the guide to cause at least a part of the guide to move relative to the second frame in a direction away from the second frame in the open state.

DETAILED DESCRIPTION OF THE DRAWINGS

Figure 1:
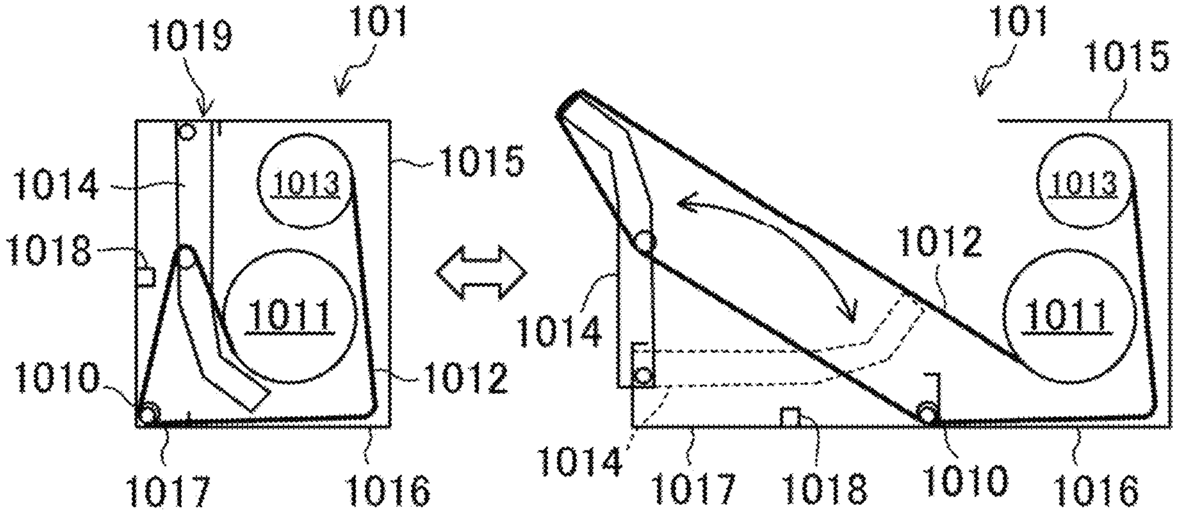
FIG. 1 shows a first configuration of a sheet storing device.

The conventional sheet storing device can expose the transport path. However, even if the transport path is exposed, the space surrounded by the guide and the frame is not exposed. The conventional sheet storing device is thus inferior in maintainability.

The technique disclosed herein facilitates the maintenance of a sheet storing device.

The technique disclosed herein relates to a sheet storing device. This sheet storing device includes: a rotary drum; a tape to be wound on an outer circumferential surface of the rotary drum so as to wrap a sheet around the rotary drum; a guide that guides the tape and the sheet to be wound on the rotary drum; and a frame that accommodates the rotary drum and the guide. The frame includes a first frame and a second frame, and the first frame and the second frame are connected movably relative to each other to change the frame between an open state and a closed state. The second frame supports the guide to cause at least a part of the guide to move relative to the second frame in a direction away from the second frame in the open state.

The user can easily perform the maintenance of this sheet storing device.

The sheet storing device may further include: a first sensor located between the second frame and the guide. In the open state, at least a part of the guide may move relative to the second frame to expose the first sensor.

The second frame or at least the part of the guide moves in a direction away from the first sensor, whereby the first sensor is exposed to the outside of the frame. The first sensor is easily accessible to a user. The user can easily perform the maintenance of the first sensor.

The sheet storing device may further include: a second sensor located between the first frame and the guide in the closed state. The frame may change from the closed state to the open state to expose the second sensor.

The second frame or at least a part of the guide moves in a direction away from the second sensor, whereby the second sensor is exposed to the outside of the frame. The second sensor is easily accessible to a user. The user can easily perform the maintenance of the second sensor.

A path of the tape may be located between the second frame and the guide. In the open state, at least a part of the guide may move relative to the second frame to expose the path of the tape.

The second frame or at least the part of the guide moves in a direction away from the path of the tape, whereby the path of the tape is exposed to the outside of the frame. The path of the tape is easily accessible to a user. The user can easily perform the maintenance of the path of the tape.

The rotary drum may be located between the second frame and the guide. In the open state, at least a part of the guide may move relative to the second frame to expose the rotary drum.

The second frame or at least the part of the guide moves in a direction away from the rotary drum, whereby the rotary drum is exposed to the outside of the frame. The rotary drum is easily accessible to a user. The user can easily perform the maintenance of the rotary drum.

The guide may include a first guide and a second guide. In the open state, the first guide and the second guide may move relative to each other to expose the transport path of the sheet.

The first or second guide moves in a direction away from the transport path of the sheets, whereby the transport path is exposed to the outside of the frame. The transport path is easily accessible to a user. The user can easily perform the maintenance of the transport path of the sheets.

The frame may be in a rectangular shape in the closed state. The first frame and the second frame may be pivotally supported to each other. The first frame and the second frame may turn 90 degrees, while the frame changes between the closed state and the open state.

The inside of the frame is exposed largely.

The first frame and the second frame may stop at an angle at which the frame is in a half-open state between the closed state and the open state.

The user can perform the maintenance of the sheet storing device in the half-open state of the frame.

At least a part of the frame may be made of a transparent or translucent resin material.

The user can view the inside of the frame without opening the frame.

The frame may have a slit that allows an inside and an outside of the frame to communicate with each other.

Through the slit, foreign objects, such as paper dust of the sheets, are discharged from the inside to the outside of the frame.

An embodiment of a sheet storing device will be described in detail below with reference to the drawings. The sheet storing device described herein is an example.

The sheet storing device is attached to a sheet handling apparatus. The sheet handling apparatus performs processes related to paper sheets. Examples of the sheets include banknotes, checks, vouchers, or securities. The sheet handling apparatus performs, for example, a process of taking in sheets from the outside to the inside. The sheet storing device stores the sheets taken into the sheet handling apparatus. In addition, the sheet handling apparatus performs, for example, a process of feeding the sheets from the inside to the outside. The sheet storing device discharges the sheets to be fed out of the sheet handling apparatus.

(First Configuration)

FIG. 1 shows a sheet storing device 101 with a first configuration. The sheet storing device 101 includes a rotary drum 1011, a tape 1012, a reel 1013, a guide 1014, and a frame 1015.

The rotary drum 1011 rotates about an axis. The rotary drum 1011 winds up the sheets entering the frame 1015, together with the tape 1012.

The reel 1013 winds up the tape 1012. The tape 1012 pulled out from the reel 1013 is wound on the rotary drum 1011.

The guide 1014 guides the sheets and the tape 1012 to the rotary drum 1011. The guide 1014 constitutes at least a part of the transport path of the sheets. The guide 1014 is close to the rotary drum 1011.

The frame 1015 accommodates the rotary drum 1011, the tape 1012, the reel 1013, and the guide 1014. The frame 1015 is in a rectangular shape. The frame 1015 has an opening 1019 through which the sheets enter.

The frame 1015 includes a first frame 1016 and a second frame 1017. The first frame 1016 and the second frame 1017 are connected movably relative to each other. More specifically, the first frame 1016 and the second frame 1017 are pivotally supported to each other at a pivot shaft 1010. Once the second frame 1017 turns relative to the first frame 1016, the frame 1015 changes between a closed state and an open state. The left of FIG. 1 shows the closed state of the frame 1015, while the right of FIG. 1 shows the open state of the frame 1015.

In the closed state, the frame 1015 isolates the rotary drum 1011, the tape 1012, the reel 1013, and the guide 1014 from the outside. The user cannot access the rotary drum 1011, the tape 1012, the reel 1013, and the guide 1014. In the open state, the frame 1015 exposes the inside thereof. The user can access the rotary drum 1011, the tape 1012, the reel 1013, the guide 1014, and the transport path of the sheets. The user can perform the maintenance of the sheet storing device 101.

Hereinafter, the configuration of the sheet storing device 101 will be described more in detail. The first frame 1016 supports the rotary drum 1011 and the reel 1013. The second frame 1017 supports the guide 1014. More specifically, the proximal end of the guide 1014 is pivotally supported by the second frame 1017.

A part of the path of the tape 1012 is located between the second frame 1017 and the guide 1014. A first sensor 1018 is located between the second frame 1017 and the guide 1014. The first sensor 1018 is a sensor for detecting the running conditions of the tape 1012, for example. The running conditions of the tape 1012 include the running speed of the tape 1012, for example.

The second frame 1017 can turn 90° with respect to the first frame 1016. Once the user turns the second frame 1017, the second frame 1017 and the guide 1014 move away from the rotary drum 1011. The user can access the rotary drum 1011, the guide 1014, the reel 1013, and the transport path of the sheets. The user can easily perform the maintenance of the rotary drum 1011, the guide 1014, the reel 1013, and the transport path of the sheets.

In the open state of the frame 1015, the guide 1014 can relatively move in a direction away from the second frame 1017. More specifically, the guide 1014 can turn in a direction away from the second frame 1017. The guide 1014 stands up with respect to the fallen second frame 1017.

Once the guide 1014 turns as indicated by the arrow in the right diagram of FIG. 1, the path of the tape 1012 and the first sensor 1018 hidden behind the guide 1014 are exposed. Since the path of the tape 1012 and the first sensor 1018 are exposed, the user can access the path of the tape 1012 and the first sensor 1018. The user can easily perform the maintenance of the path of the tape 1012 and the first sensor 1018.

The user can easily perform the maintenance of this sheet storing device 101.

(Second Configuration)

Figure 2:
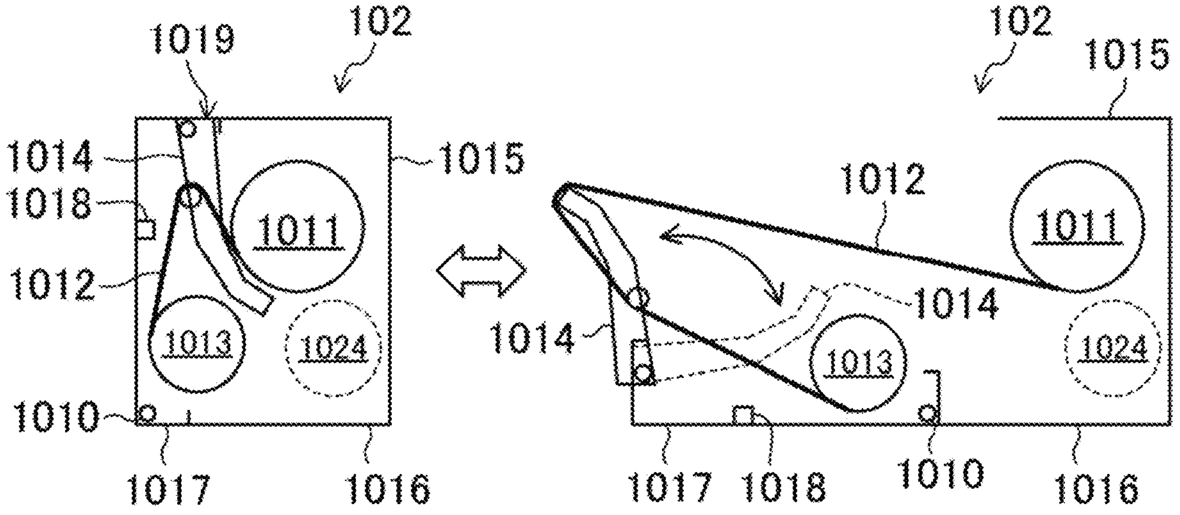
FIG. 2 shows a second configuration of the sheet storing device.

FIG. 2 shows a sheet storing device 102 with a second configuration. The sheet storing device 102 is a variation of the sheet storing device 101 shown in FIG. 1.

The reel 1013 of the sheet storing device 102 is supported by the second frame 1017. Once the second frame 1017 turns with respect to the first frame 1016, the guide 1014 and the reel 1013 move away from the first frame 1016 as shown in the right diagram of FIG. 2. The user can easily perform the maintenance of the transport path of the sheets and the rotary drum 1011.

In the open state of the frame 1015, the guide 1014 can relatively move in a direction away from the second frame 1017. Once the guide 1014 turns, the path of the tape 1012, the first sensor 1018, and the reel 1013 are exposed. The user can easily perform the maintenance of the path of the tape 1012, the first sensor 1018, and the reel 1013.

Note that the sheet storing device 102 may include a second reel 1024 circled by the broken line in FIG. 2. The second reel 1024 winds up another tape. The rotary drum 1011 winds up the sheets sandwiched between the tape 1012 and the other tape. In the configuration example of FIG. 2, the second reel 1024 is supported by the first frame 1016. The second reel 1024 may be supported by the second frame 1017.

(Third Configuration)

Figure 3:
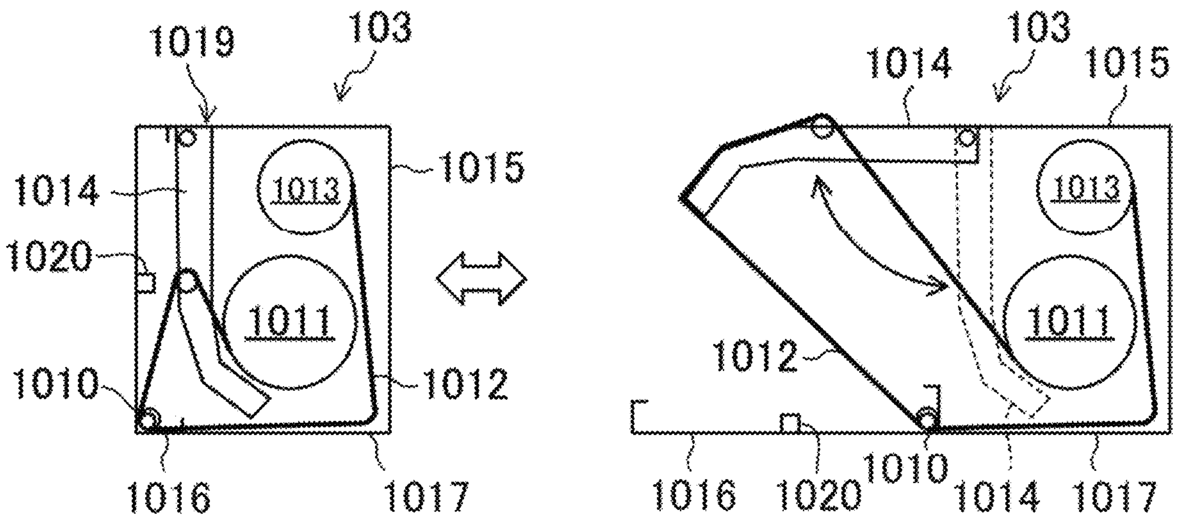
FIG. 3 shows a third configuration of the sheet storing device.

FIG. 3 shows a sheet storing device 103 with a third configuration. The sheet storing device 103 is another variation of the sheet storing device 101 shown in FIG. 1. The first frame 1016 and the second frame 1017 of the sheet storing device 103 are in the reverse positions of the first frame 1016 and the second frame 1017 of the sheet storing device 101.

The second frame 1017 of the sheet storing device 103 supports the rotary drum 1011, the reel 1013, and the guide 1014. Once the first frame 1016 turns relative to the second frame 1017, the inside of the frame 1015 is exposed.

A second sensor 1020 is attached to the first frame 1016. The second sensor 1020 detects the running conditions of the tape 1012, for example. Once the first frame 1016 turns, a part of the path of the tape 1012 and the second sensor 1020 are exposed. The user can easily perform the maintenance of the path of the tape 1012 and the second sensor 1020.

In the open state of the frame 1015, the guide 1014 can relatively move in a direction away from the second frame 1017. Once the guide 1014 turns, the transport path of the sheets, the rotary drum 1011, and the reel 1013 are exposed. The user can easily perform the maintenance of the transport path of the sheets, the rotary drum 1011, and the reel 1013.

(Fourth Configuration)

Figure 4:
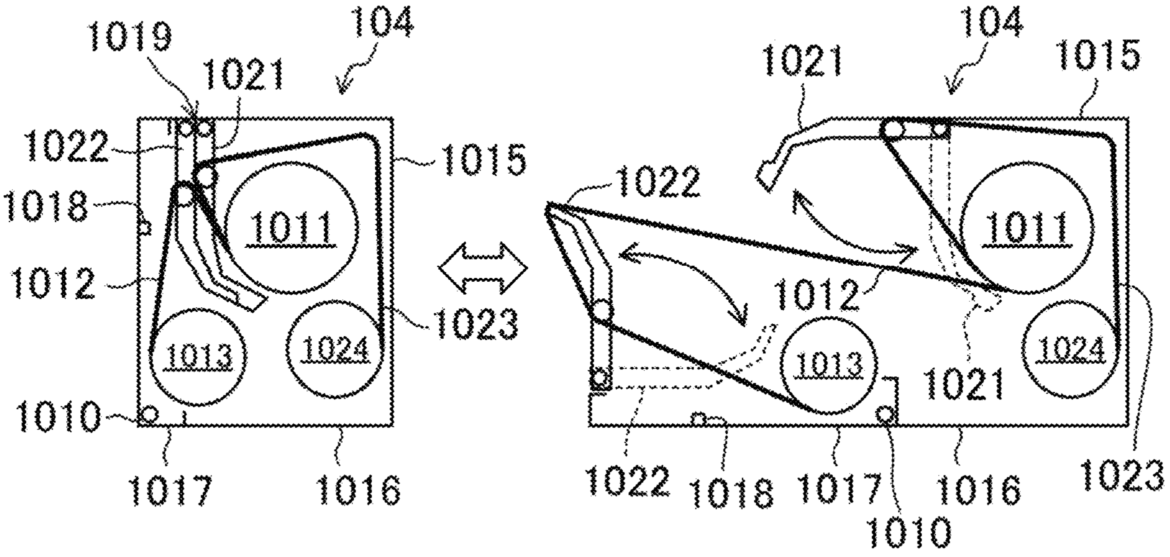
FIG. 4 shows a fourth configuration of the sheet storing device.

FIG. 4 shows a sheet storing device 104 with a fourth configuration. The sheet storing device 104 is yet another variation of the sheet storing device 101 shown in FIG. 1.

The guide of the sheet storing device 104 includes a first guide 1021 and a second guide 1022. The first guide 1021 and the second guide 1022 overlap each other. The sheets pass between the first guide 1021 and the second guide 1022 and are transported to the rotary drum 1011. The first guide 1021 and the second guide 1022 constitute a part of the transport path of the sheets.

The tape 1012 pulled out from the first reel 1013 reaches the rotary drum 1011 via the second guide 1022. A tape 1023 pulled out from the second reel 1024 reaches the rotary drum 1011 via the first guide 1021. The first reel 1013 is supported by the second frame 1017. The second reel 1024 is supported by the first frame 1016.

The first frame 1016 supports the first guide 1021. The proximal end of the first guide 1021 is pivotally supported by the first frame 1016. The second frame 1017 supports the second guide 1022. The proximal end of the second guide 1022 is pivotally supported by the second frame 1017.

Once the second frame 1017 turns, the first guide 1021 and the second guide 1022 move away from each other to expose the transport path of the sheets. The user can easily perform the maintenance of the transport path.

In the open state of the frame 1015, the first guide 1021 can relatively move in a direction away from the first frame 1016. Once the first guide 1021 turns, the rotary drum 1011, the second reel 1024, and the paths of the tapes 1012 and 1023 are exposed. The user can easily perform the maintenance of the rotary drum 1011 and the second reel 1024.

In the open state of the frame 1015, the second guide 1022 can relatively move in a direction away from the second frame 1017. Once the second guide 1022 turns, the first reel 1013, the first sensor 1018, and the path of the tape 1012 are exposed. The user can easily perform the maintenance of the first reel 1013, the first sensor 1018, and the path of the tape 1012.

(Fifth Configuration)

Figure 5:
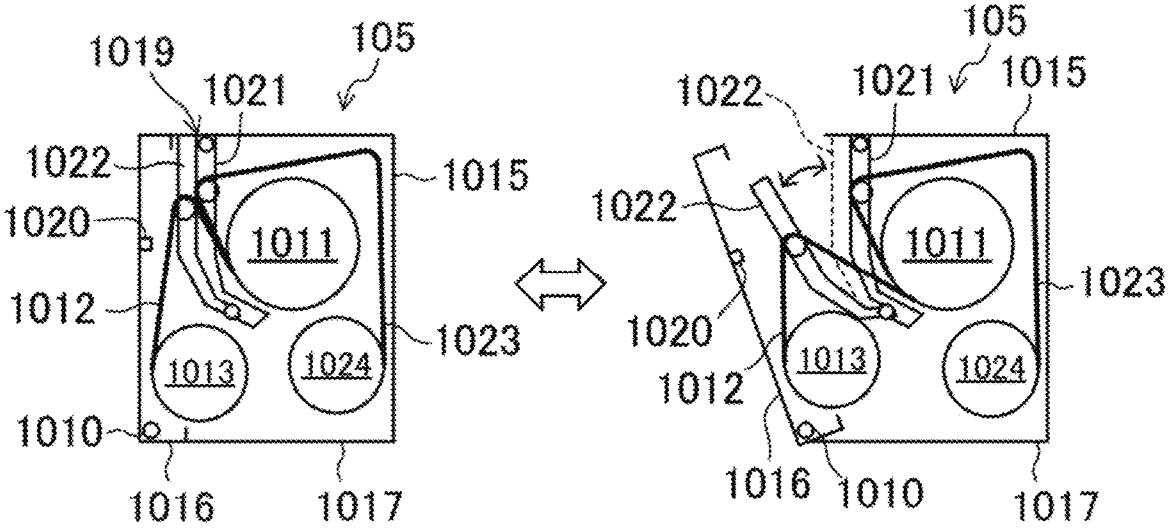
FIG. 5 shows a fifth configuration of the sheet storing device.

FIG. 5 shows a sheet storing device 105 with a fifth configuration. The sheet storing device 105 is yet another variation of the sheet storing device 101 shown in FIG. 1.

The first guide 1021 and the second guide 1022 of the sheet storing device 105 are supported by the second frame 1017. The proximal end of the first guide 1021 is pivotally supported by the second frame 1017. The distal end of the second guide 1022 is pivotally supported by the distal end of the first guide 1021.

Once the first frame 1016 turns, the second sensor 1020 attached to the first frame 1016 is exposed.

In the open state of the frame 1015, the second guide 1022 can relatively move in a direction away from the second frame 1017. Once the second guide 1022 turns, the transport path of the sheets and the paths of the tapes 1012 and 1023 are exposed. The user can easily perform the maintenance of the transport path and the paths of the tapes 1012 and 1023.

The configurations illustrated in FIGS. 1 to 5 can be combined with each other. For example, the first guide 1021 and the second guide 1022 of the sheet storing device 105 in FIG. 5 can be combined with the sheet storing device 101 in FIG. 1 or the sheet storing device 102 in FIG. 2.

In addition, the guide 1014, the first guide 1021, or the second guide 1022 is not limited to a single member. The guide 1014, the first guide 1021, or the second guide 1022 may each include a plurality of members to bend at an intermediate position thereof.

(Sixth Configuration)

FIGS. 6 to 11 show a sheet storing device 9 with a sixth configuration. The sheet storing device 9 is still another variation of the sheet storing device 101 shown in FIG. 1. For easier understanding, the X-axis, the Y-axis, and the Z-axis are shown in each drawing with an Y-axis positive direction extending from the left to the right of the paper, an X-axis positive direction extending from the front to the rear in the direction orthogonal to the paper, and a Z-axis positive direction extending from the bottom to the top of the paper. The sheet storing device is attached to a sheet handling apparatus. The Y-axis positive direction corresponds to a direction from the front to the rear of the sheet handling apparatus, the X-axis positive direction corresponds to a direction from the right to the left of the sheet handling apparatus, and the Z-axis positive direction corresponds to a direction from the bottom to the top of the sheet handling apparatus. The front of the sheet handling apparatus corresponds to the side with an inlet through which sheets are inserted. The right and left of the sheet handling apparatus correspond to the right and left as viewed by the user facing the front of the sheet handling apparatus, for example.

The sheet storing device 9 includes a storing mechanism 90 and a frame 91 accommodating the storing mechanism 90. The sheet storing device 9 has, on the upper surface thereof, an opening 910 for taking sheets in and out.

Figure 6:
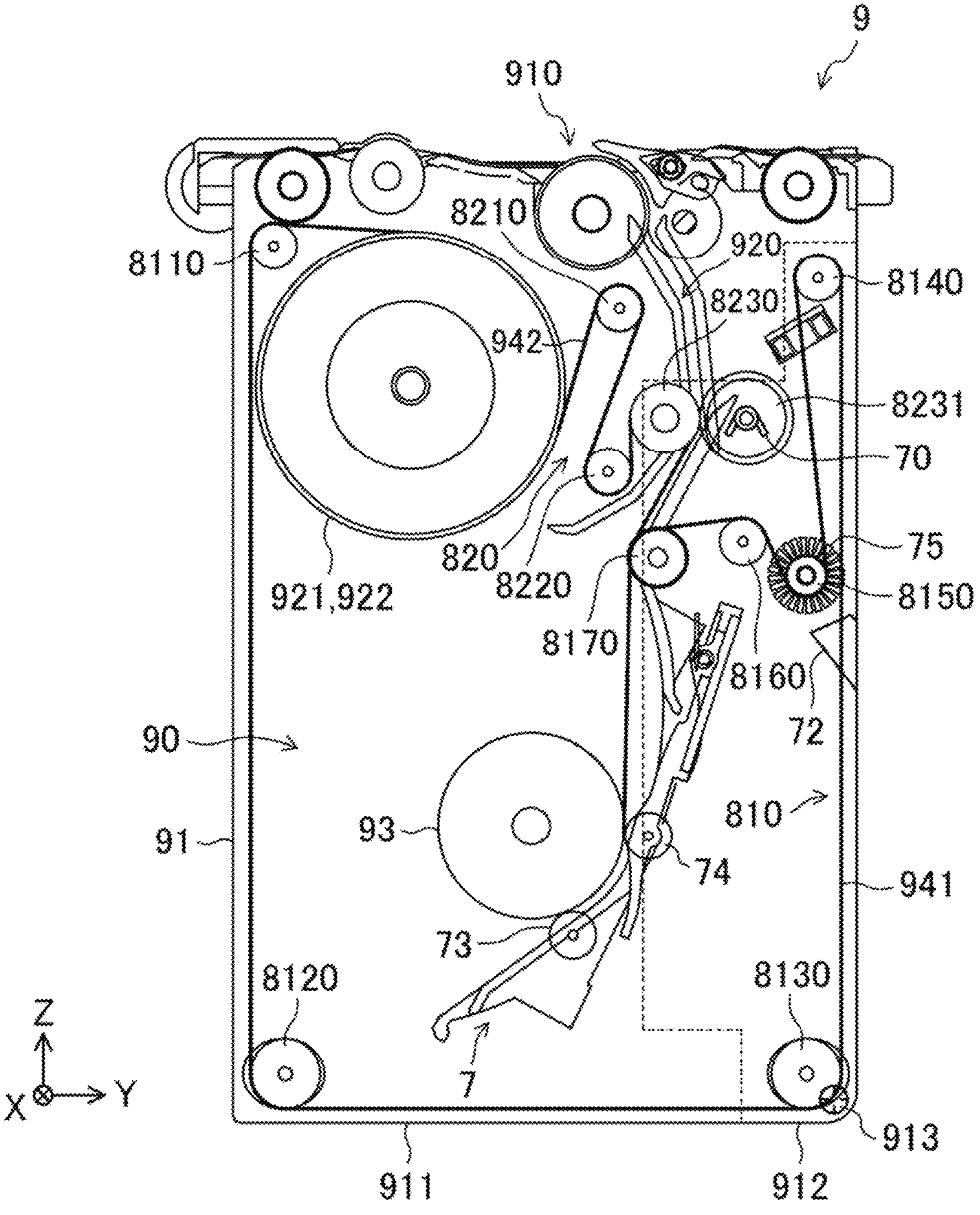
FIG. 6 shows a sixth configuration of the sheet storing device.
Figure 7:
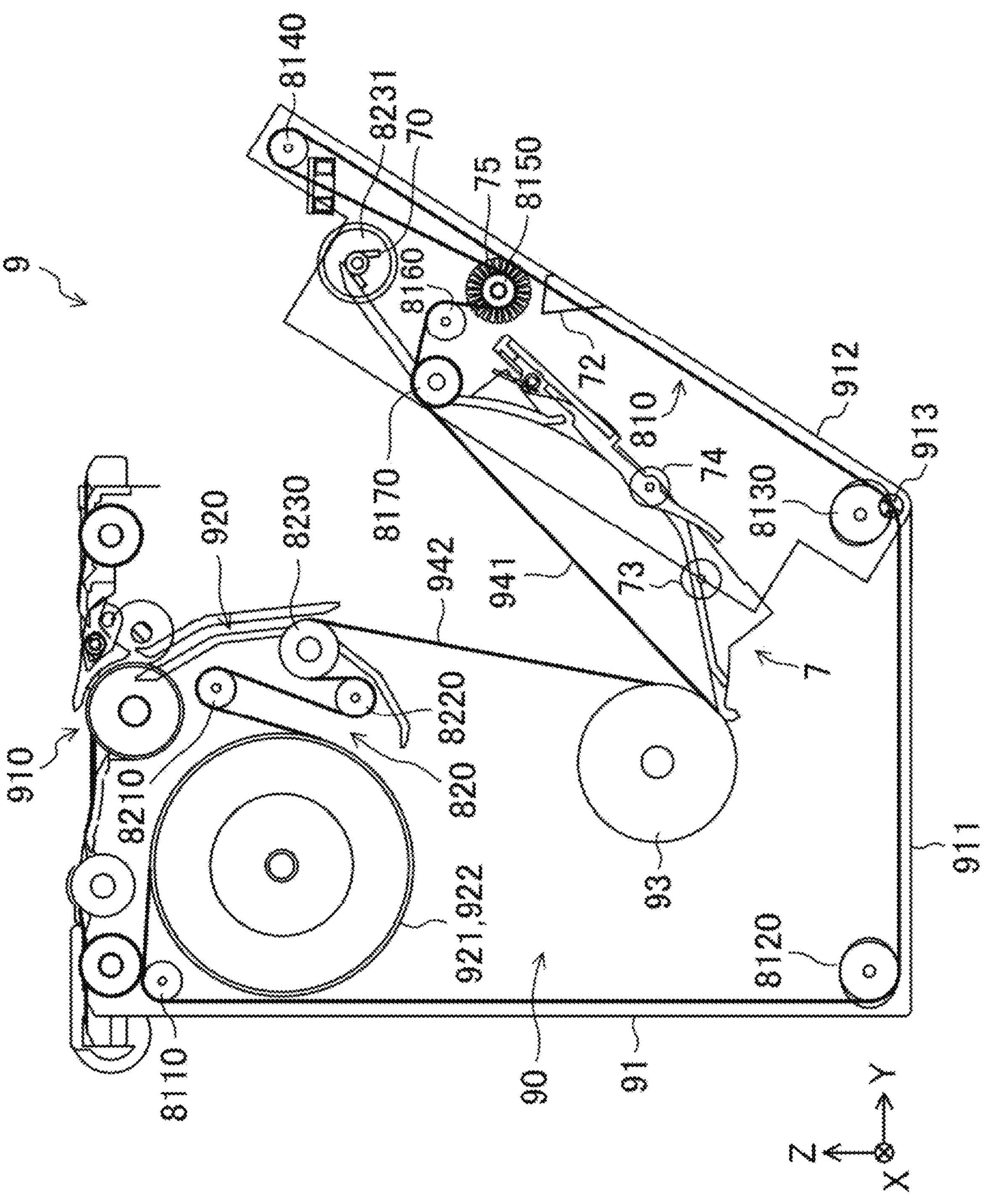
FIG. 7 shows the sheet storing device in a half-open state.
Figure 8:
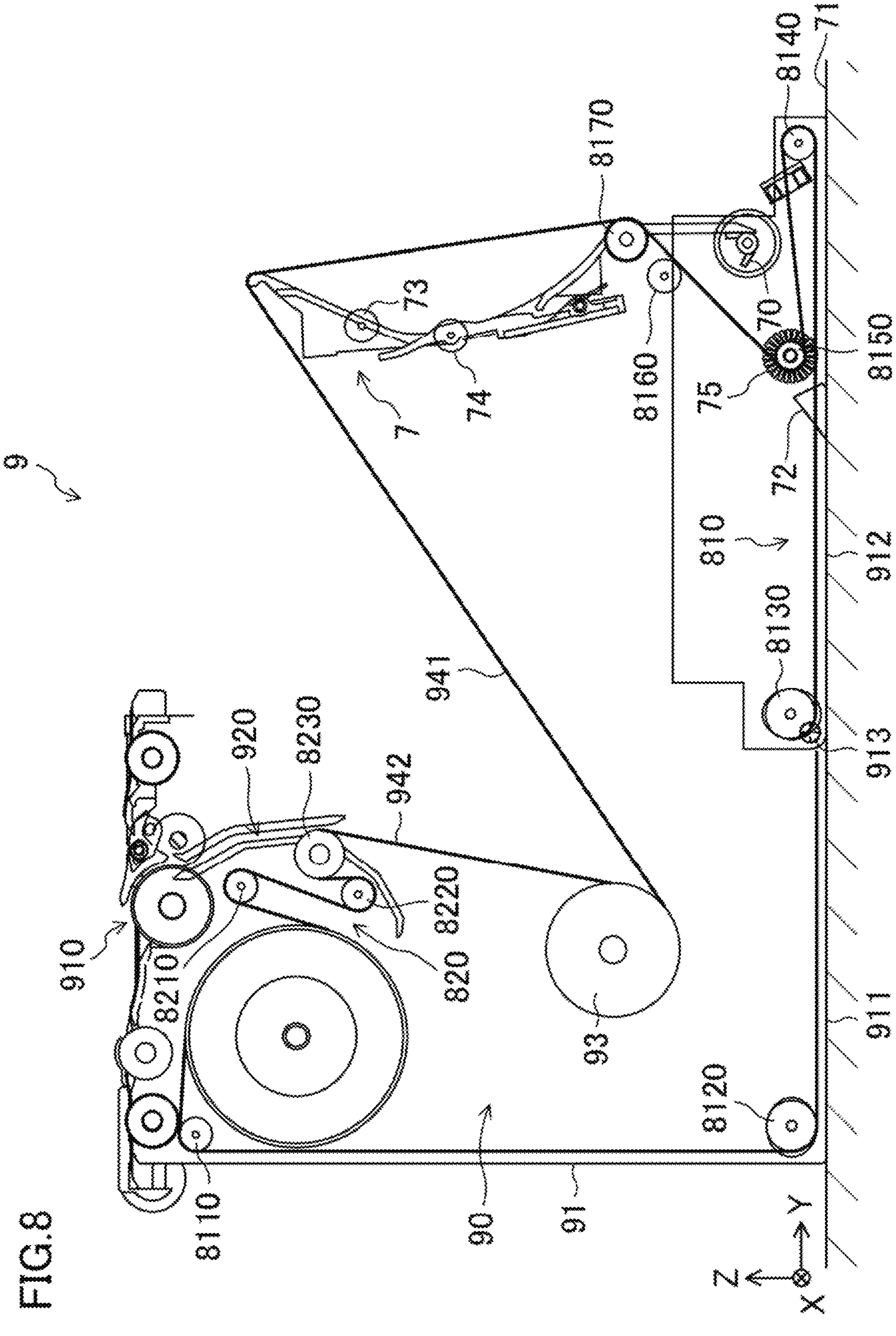
FIG. 8 shows the sheet storing device in an open state.

The storing mechanism 90 winds, on a drum 93, the sheets sandwiched between the tapes, together with the tapes. The storing mechanism 90 includes two first reels 921, two second reels 922, and the drum 93. Only one reel is shown in FIGS. 6 to 8. This is because the four reels 921 and 922 in total are shifted along the X-axis and are located at the same positions along the Y- and the Z-axes. Such a reel arrangement is described in detail in Japanese Unexamined Patent Publication No. 2020-047258 (Applicant: GLORY LTD.).

The proximal end of a first tape 941 is fixed to each first reel 921, and the first tape 941 is wound around the first reel 921. The proximal end of a second tape 942 is fixed to each second reel 922, and the second tape 942 is wound around the second reel 922. The distal end of the first tape 941 and the distal end of the second tape 942 are engaged with the outer circumferential surface of the drum 93.

The first tape 941 pulled out from each first reel 921 and the corresponding second tape 942 pulled out from the corresponding second reel 922 are wound in a stacked manner on the outer circumferential surface of the drum 93. The sheets are sandwiched between the first and second tapes 941 and 942.

The drum 93 rotates in the winding direction and the feeding direction of the sheets and the tapes. In the example shown in FIG. 6, the drum 93 winds the sheets and the tapes in the clockwise direction, and feeds the sheets and the tapes in the counterclockwise direction.

FIG. 6 shows the sheet storing device 9 storing no sheet. The drum 93 has a relatively small diameter. Since the drum 93 has a small diameter, the sheet storing device 9 can have a large capacity without increasing the size of the frame 91. That is, the drum 93 has a diameter less increased by winding a large number of sheets.

A transport path 920 is formed between the opening 910 and the drum 93. The transport path 920 includes a pair of rollers, a fixed guide member, and a movable guide 7 which will be described later. The sheets are transported along the transport path 920 in a direction from the opening 910 toward the drum 93 or in a direction from the drum 93 toward the opening 910.

The frame 91 includes a first frame 911 and a second frame 912. The first frame 911 and the second frame 912 are pivotally supported to each other at a pivot shaft 913. The pivot shaft 913 is located at the lower end of the sheet storing device 9, at the end in the Y-axis positive direction.

The first frame 911 supports a shaft 930 of the drum 93. The axis of the drum 93 extends along the X-axis. The first frame 911 also supports the first and second reels 921 and 922.

The first tape 941 pulled out from each first reel 921 runs along a first tape path 810 to reach the drum 93. The first tape path 810 includes first tape pulleys 8110, second tape pulleys 8120, third tape pulleys 8130, fourth tape pulleys 8140, fifth tape pulleys 8150, sixth tape pulleys 8160, and seventh tape pulleys 8170. The first tape path 810 goes around the drum 93. Note that there are two first tape pulleys 8110, two second tape pulleys 8120, two third tape pulleys 8130, two fourth tape pulleys 8140, two fifth tape pulleys 8150, two sixth tape pulleys 8160, and two seventh tape pulleys 8170, corresponding to the two first tapes 941. The first and second tape pulleys 8110 and 8120 are each supported by the first frame 911, while the third, fourth, fifth, and sixth tape pulleys 8130, 8140, 8150, and 8160 are each supported by the second frame 912. The seventh tape pulleys 8170 are supported by the movable guide 7.

The axes of rotation of the second and third tape pulleys 8120 and 8130 are each inclined with respect to the X-axis. The first tape 941 pulled out from each first reel 921 is wound on the second and third tape pulleys 8120 and 8130 each having the inclined axis of rotation, whereby its position along the X-axis changes from the position of the first reel 921 to the position of the second reel 922. The first tape 941 is then wound on the corresponding fourth, fifth, and sixth tape pulleys 8140, 8150, and 8160, and reaches the corresponding seventh tape pulley 8170. At this time, the first tape 941 is located at the same position as the corresponding second tape 942 along the X-axis.

The second tape 942 pulled out from each second reel 922 runs along a second tape path 820 to reach the drum 93. The second tape path 820 includes eighth tape pulleys 8210, ninth tape pulleys 8220, tenth tape pulleys 8230, and the seventh tape pulleys 8170. There are also two eighth tape pulleys 8210, two ninth tape pulleys 8220, and two tenth tape pulleys 8230, corresponding to the two second tapes 942. The eighth, ninth, and tenth tape pulleys 8210, 8220, and 8230 are each supported by the first frame 911.

Each seventh tape pulley 8170 stacks and guides the corresponding first and second tapes 941 and 942 toward the outer circumferential surface of the drum 93. The sheets are sandwiched between the first and second tapes 941 and 942 at the position of the seventh tape pulley 8170.

In a forward rotation of the drum 93, the sheets sandwiched between the first and second tapes 941 and 942 are wound on the outer circumferential surface of the drum 93, together with the first and second tapes 941 and 942. The sheet storing device 9 stores the sheets. At this time, the drum 93 rotates in the clockwise direction in the figure, and the first reel 921 and the second reel 922 rotate in the counterclockwise direction in the figure.

In a forward rotation of the first and second reels 921 and 922, the sheets sandwiched between the first and second tapes 941 and 942 are fed out from the outer circumferential surface of the drum 93, together with the first and second tapes 941 and 942. The sheets then pass through the transport path 920 and are fed out through the opening 910 to the outside of the sheet storing device 9. At this time, the first and second reels 921 and 922 rotate in the clockwise direction in the figure, and the drum 93 rotates in the counterclockwise direction in the figure.

The movable guide 7 guides the first tape 941, the second tape 942, and the sheets toward the drum 93.

The proximal end, that is, the upper end in FIG. 6, of the movable guide 7 is turnably attached to the second frame 912. The movable guide 7 turns about a turning shaft near each tenth tape pulley 8230. The turning shaft of the movable guide 7 may be placed on the same axis as the shaft of a pulley 8231 opposed to each tenth tape pulley 8230. The second frame 912 displaceably supports the movable guide 7. The movable guide 7 is biased in the clockwise direction in FIG. 6 by a torsion spring 70.

Figure 9A:
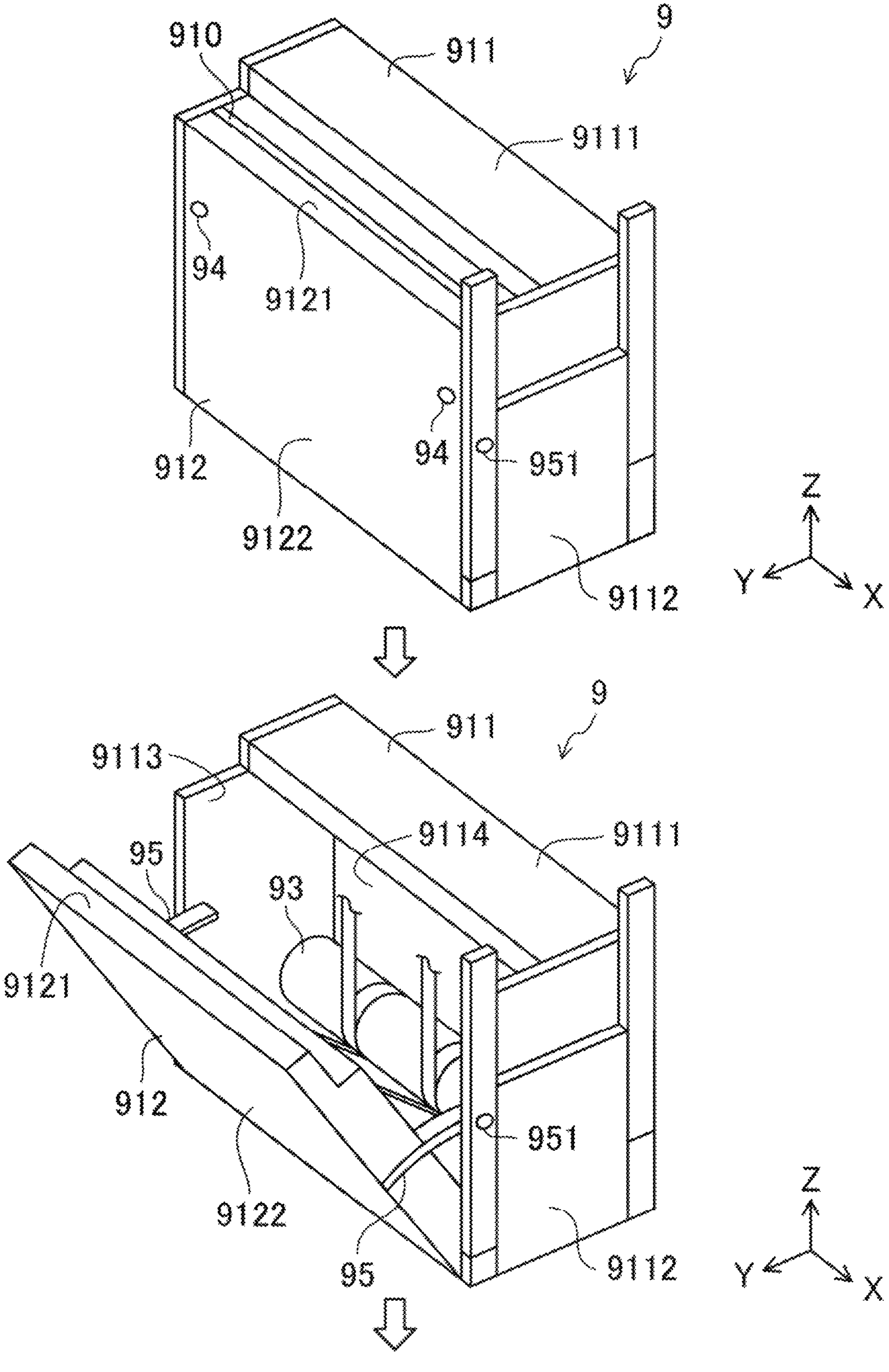
FIG. 9A shows the sheet storing device that transitions from a closed state to the half-open state.
Figure 9B:
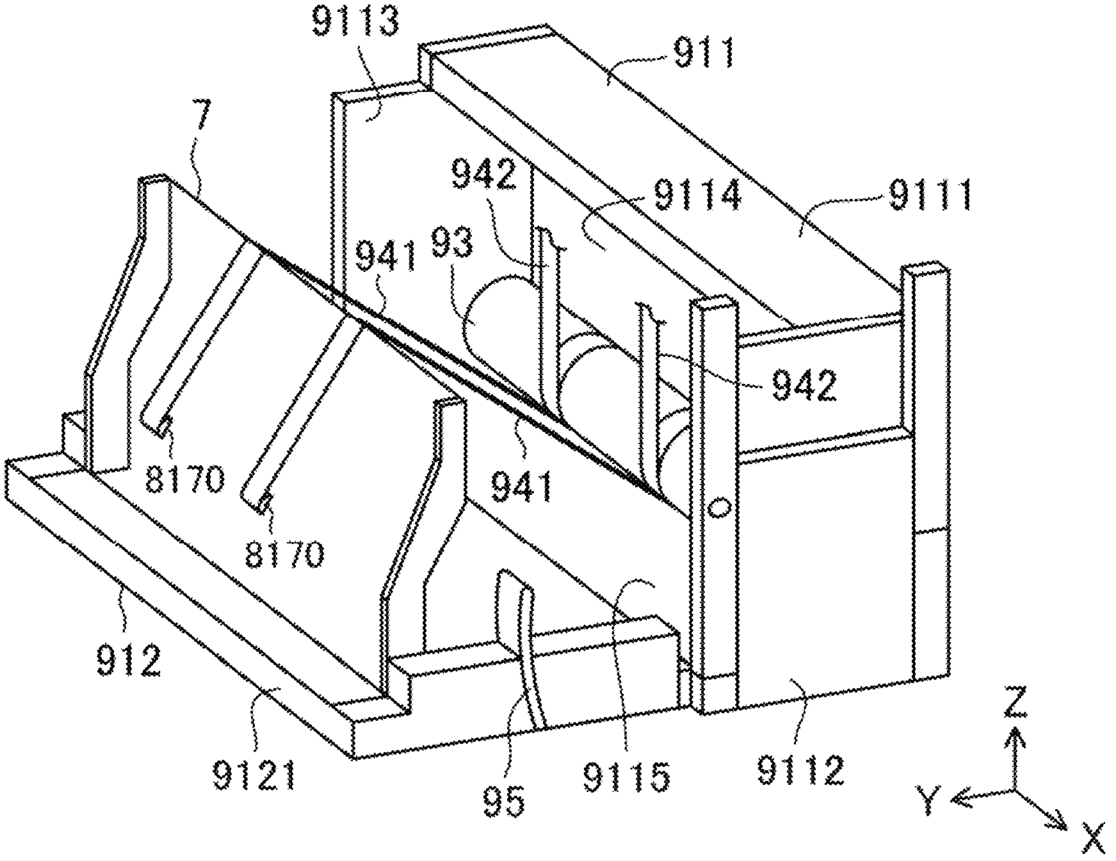
FIG. 9B shows the sheet storing device in the open state.
Figure 11:
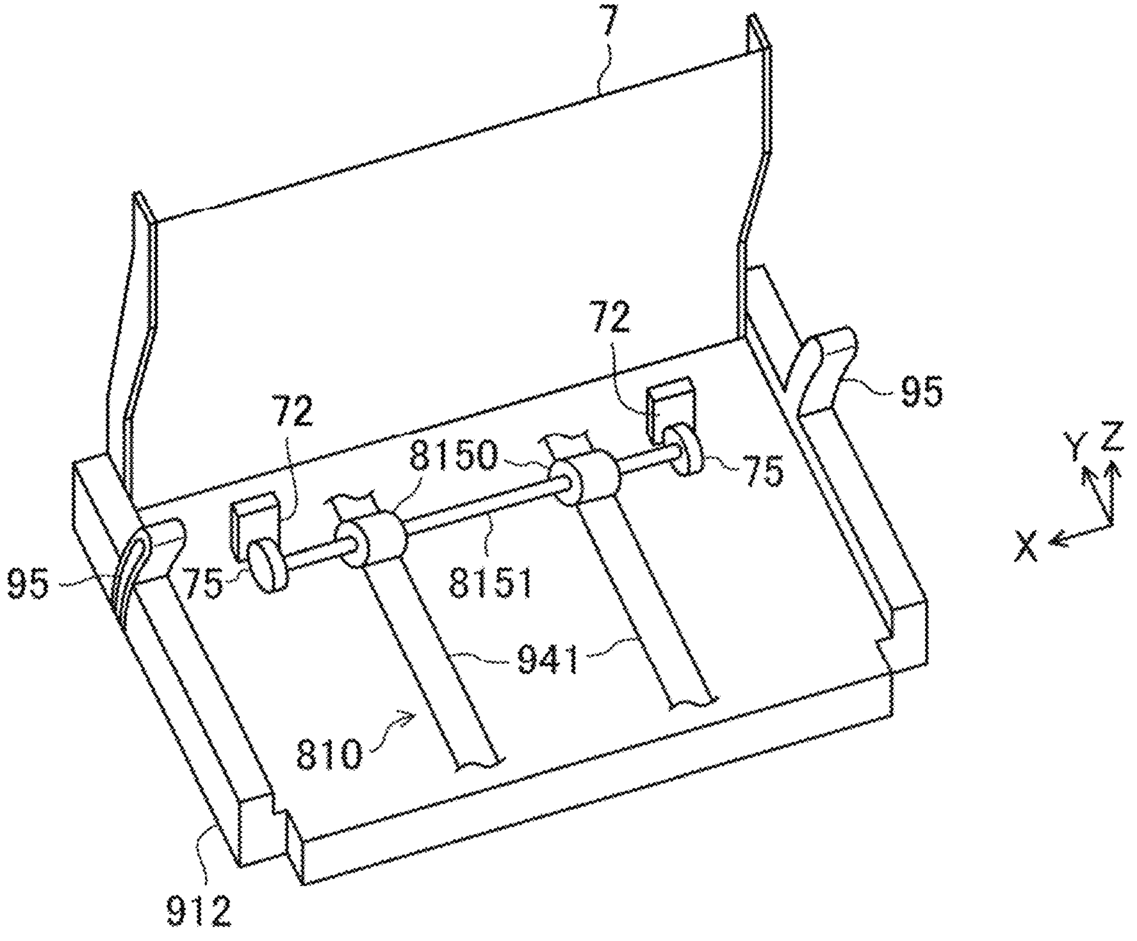
FIG. 11 shows a second frame and a guide.

As shown in FIG. 9B or 11, the movable guide 7 is in a plate shape expanding in the X- and Z-directions. The seventh tape pulleys 8170 are attached to the top of the movable guide 7. In the state shown in FIG. 6, the top of the movable guide 7 is located on the positive side of the Z-axis. While being spaced apart from each other in the X-direction, the two seventh tape pulleys 8170 are attached to the movable guide 7. The distance between the two seventh tape pulleys 8170 corresponds to the distance between the two first tapes 941.

Second pressing members 73 are attached to lower portions of the movable guide 7. In the state shown in FIG. 6, the lower portions of the movable guide 7 are located on the negative side of the Z-axis. The second pressing members 73 are each a roller that is attached to the movable guide 7 so as to rotate about an axis (i.e., axis of rotation) extending along the X-axis. Two second pressing members 73 are attached to the movable guide 7. The distance between the two second pressing members 73 corresponds to the distance between the two first tapes 941. Each second pressing member 73 presses, against the drum 93, the first and second tapes 941 and 942 wound on the drum 93 and the sheets sandwiched between the first and second tapes 941 and 942. Accordingly, the second pressing members 73 increase the adhesion among the first tapes 941, the second tape pulleys 8120, and the sheets. The drum 93 can stably wind the first and second tapes 941 and 942 and the sheets.

Each second pressing member 73 abuts on the outermost point of the drum 93, whereby the movable guide 7 turns with an increasing diameter of the drum 93. More specifically, the movable guide 7 is biased in the clockwise direction in FIG. 6 by the torsion spring 70. With an increase in the diameter of the drum 93, the movable guide 7 turns in the counterclockwise direction. Even with a change in the diameter of the drum 93, the movable guide 7 can guide the first and second tapes 941 and 942 and the sheets to the drum 93.

One or more first pressing members 74 are attached to the movable guide 7. The first pressing member(s) 74 press(es) the sheets to be wound on the drum 93 against the outer circumferential surface of the drum 93. The first pressing member(s) 74 is/are a roller(s). The first pressing member(s) 74 is/are attached to the movable guide 7 so as to rotate about an axis (i.e., axis of rotation) extending along the X-axis. The movable guide 7 supports the first pressing member(s) 74.

The first pressing member(s) 74 is/are located between the two first tapes 941 and the two second tapes 942. In other words, two first pressing members 74 are shifted along the X-axis with respect to the two first tapes 941 and the two second tapes 942.

The movable guide 7 is biased by the torsion spring 70, whereby the first pressing members 74 abut on the outer circumferential surface of the drum 93. Once the drum 93 rotates, the first pressing members 74 also rotate.

As shown in FIG. 6, each first pressing member 74 and the corresponding second pressing member 73 are shifted along the circumference of the drum 93. More specifically, with reference to the running direction of the first and second tapes 941 and 942 being wound on the drum 93, each first pressing member 74 is located upstream of the corresponding second pressing member 73 in the running direction of the first and second tapes 941 and 942.

Each first pressing member 74 is located at the starting point, at which the first and second tapes 941 and 942 to be wound on the drum 93 first come into contact with the drum 93. The first pressing member 74 can press, against the drum 93, a portion of each sheet, which is wound on the drum 93 together with the first and second tapes 941 and 942, not pressed by the first and second tapes 941 and 942. This reduces the bulge of the portion of each sheet not pressed by the first and second tapes 941 and 942 in a direction away from the drum 93.

(Opening and Closing Structure of Frame)

As shown in FIG. 7, once the second frame 912 turns about the pivot shaft 913, the movable guide 7 supported by the second frame 912 moves away from the drum 93. Accordingly, the first tapes 941 and the second tapes 942 move away from each other. The transport path 920 from the opening 910 to the drum 93 is then exposed. FIG. 7 corresponds to a half-opened state of the frame 91. At the occurrence of a paper jam or other problems on the transport path 920, the user of the sheet handling apparatus takes the sheet storing device 9 out of the sheet handling apparatus and turns the second frame 912 relative to the first frame 911. Accordingly, the user can access the transport path 920 of the sheets and can thus remove the sheet jammed in the transport path 920. The pivot shaft 913 may be provided at the contact point between each third tape pulley 8130 and the corresponding first tape 941. This reduces the first tape 941 fed out from the drum 93 when the second frame 912 turns about the pivot shaft 913.

The second frame 912 can further turn with respect to the first frame 911. FIG. 8 shows an open state of the frame 91. The second frame 912 can turn 90° with respect to the first frame 911. For example, when the user turns the second frame 912 with the sheet storing device 9 placed on a workbench 71, the bottom surface of the first frame 911 and the side surface of the second frame 912 abut on the workbench 71. The bottom surface of the first frame 911 and the side surface of the second frame 912 are located on the same plane. With the sheet storing device 9 placed stably on the workbench 71, the user can perform the maintenance. The user can easily perform the maintenance.

Once the second frame 912 turns, the movable guide 7 moves away from the drum 93. Since the movable guide 7 is biased by the torsion spring 70, the movable guide 7 stands up with respect to the fallen second frame 912. Here, in the sheet storing device 9 in the closed state, first sensors 72 are attached between the movable guide 7 and the second frame 912. The first sensors 72 are photosensors, for example. As shown in FIG. 11, the first sensors 72 each detect the rotation of a monitoring panel 75. The monitoring panel 75 is attached to a shaft 8151 of the corresponding fifth tape pulley 8150 and rotates in synchronization with the fifth tape pulley 8150. The first sensor 72 detects the running conditions of the corresponding first tape 941, more precisely, the running speed of the first tape 941. A controller, which receives the detection signals of the first sensors 72, can determine the diameter of the drum 93 based on the running speed of the first tapes 941 and the rotation speed of the drum 93.

As described above, once the movable guide 7 stands up, the first sensors 72 hidden behind the movable guide 7 are exposed. Since the first sensors 72 are exposed, the user can easily perform the maintenance of the first sensors 72. Once the movable guide 7 stands up, the first tape path 810 located between the movable guide 7 and the second frame 912 is exposed. The user can also easily perform the maintenance of the first tape path 810 (see also FIG. 11).

Next, a structure of the sheet storing device 9 will be further described with reference to FIGS. 9A and 9B. FIGS. 9A and 9B illustrate the sheet storing device 9 that transitions from the closed state through the half-open state to the open state.

As described above, the frame 91 of the sheet storing device 9 includes the first frame 911 and the second frame 912. Here, the first frame 911 includes a top wall 9111, left and right side walls 9112 and 9113, a rear wall 9114, and a bottom wall 9115. The second frame 912 includes a top wall 9121 and a front wall 9122. The frame 91 closed by the combination of the first frame 911 and the second frame 912 is in a rectangular shape. The inside of the frame 91 is isolated from the outside. Since no hand enters the frame 91, the user cannot touch the sheets stored in the sheet storing device 9. This increases the security of the sheet storing device 9. This also reduces a trouble of the tape caused by unexpected entry of a hand into the frame 91, for example.

Figure 10:
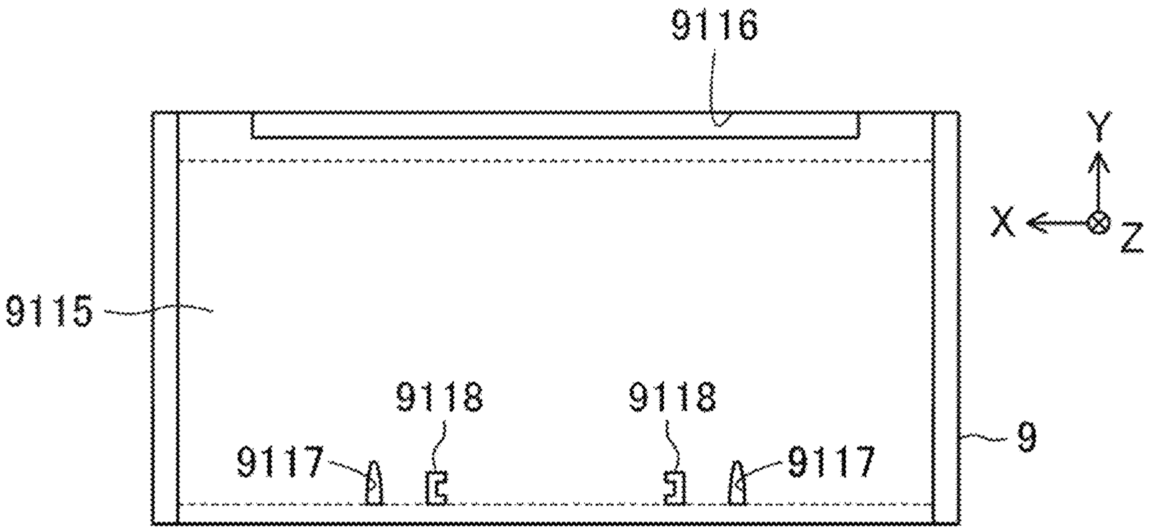
FIG. 10 shows a bottom surface of the sheet storing device.

As shown in FIG. 10, the frame 91 has, in the bottom wall 9115 thereof, a plurality of slits 9116, 9117, and 9118. The slits 9116, 9117, and 9118 are each in a size allowing no hand to enter the frame 91. Each of the slits 9116, 9117, and 9118 functions to discharge foreign objects, such as paper dust inside the frame 91, to the outside of the frame 91. The slits reduce the accumulation of the foreign objects inside the frame 91 and possible troubles in the operation of the sheet storing device 9 in advance.

The walls 9111, 9112, 9113, 9114, and 9115 of the first frame 911 and the walls 9121 and 9122 of the second frame 912 are made of a transparent or translucent material. The transparent or translucent material is a resin material, for example. The user can view the inside of the frame 91 from the outside without opening the frame 91.

As shown in the upper part of FIG. 9A, the second frame 912 is screwed to the first frame 911 using a first screw 94. The user can open the frame 91 in the closed state by removing the first screw 94.

The second frame 912 has a groove 95 on each of left and right sides. The groove 95 is in an arc shape. The distal end of a second screw 951 attached to each side of the first frame 911 is engaged with the groove 95. Once the second frame 912 turns, the second screw 951 relatively moves inside the groove 95. Once the second frame 912 turns at a predetermined angle, the second screw 951 abuts on an end of the groove 95 and thus restricts further turning of the second frame 912 (see the lower part of FIG. 9A). This state corresponds to the half-open state of the frame 91. That is, the first frame 911 and the second frame 912 stop at an angle at which the frame 91 is in the half-open state between the closed state and the open state. For example, when there is only a need to take out a sheet jammed in the transport path 920 of the sheets, the user of the sheet storing device 9 can take out the sheet by removing only the first screw 94 and bringing the frame 91 into the half-open state.

Once the user removes the second screws 951, the engagement between the second screws 951 and the grooves 95 is released. The second frame 912 can thus further turn from the half-opened state. As shown in FIG. 9B, the second frame 912 turns 90° with respect to the first frame 911, thereby bringing the frame 91 into the open state. In this state, as described above, the movable guide 7 stands up with respect to the fallen second frame 912. In the open state of the frame 91, as illustrated in FIG. 11, since the first sensor 72 and a part of the first tape path 810 are exposed, the user can easily perform the maintenance of the first sensor 72 and the first tape path 810. For example, the second screws 951 may be removed by maintenance staff of the sheet storing device 9, not by the user of a sheet handling apparatus 1. The maintenance staff can perform various types of maintenance of the sheet storing device 9 with the frame 91 opened. On the other hand, the user does not open the frame 91, which reduces unexpected touch of the inside of the frame 91. By bringing the frame 91 into the half-open state, however, the user can resolve the paper jam that may occur during the use of the sheet storing device 9. Both the usability and maintainability of the sheet storing device 9 are achievable.

What is claimed is:

1. A sheet storing device, comprising:

a rotary drum;

a tape to be wound on an outer circumferential surface of the rotary drum so as to wrap a sheet around the rotary drum;

a frame that includes a first frame and a second frame, the frame forming a space which accommodates the rotary drum; and an engagement member turnably engaged with the sheet storing device, wherein the first frame and the second frame are movably connected relative to each other to allow a transition between a closed state and an open state, the closed state is a state in which the space is covered by the second frame and is not exposed, the open state is a state in which the space is not covered by the second frame and is exposed, the first frame includes a first wall, the second frame includes a second wall that has a plate shape and is turnably supported by the first frame, in the closed state, the second wall is opposed to the first wall, in the open state, the second wall is inclined at an inclination angle of 45 degrees or more and 90 degrees or less with respect to the first wall, the tape moves as the engagement member is turned in the open state, and the engagement member has a plate shape.

2. The sheet storing device of claim 1, wherein the engagement member is exposed to an outside of the sheet storing device in the open state.

3. The sheet storing device of claim 1, wherein the second frame includes a pulley on which the tape is wound, the tape is disposed in the second frame so that a portion of the tape has, through the pulley, a two-layer structure in a region opposed to the second frame, and during the transition from the closed state to the open state, the portion of the tape in the two-layer structure moves with the second frame so as to be inclined with respect to the first wall.

4. The sheet storing device of claim 1, wherein a portion of the tape that is located in a region opposed to the second frame is inclined with respect to the second wall in the open state.

5. The sheet storing device of claim 1, further comprising:

an opening for taking the sheet from an outside to an inside of the sheet storing device; and a support shaft that supports the second frame turnably relative to the first frame, wherein a distance between the opening and the support shaft is larger than a distance between the rotary drum and the support shaft.

6. The sheet storing device of claim 5, wherein a distance between a reel that holds the tape and the support shaft is larger than a distance between the rotary drum and the support shaft.

7. The sheet storing device of claim 5, wherein a guide is provided at the opening, the guide protruding outward from the sheet storing device and being opposed to the tape.

8. The sheet storing device of claim 1, further comprising:

a first reel that holds the tape serving as a first tape;

a second tape to be wound with the first tape on the outer circumferential surface of the rotary drum so as to wrap the sheet around the rotary drum; and a second reel that holds the second tape, wherein in a region opposed to the second frame, the first tape and the second tape overlap each other and hold the sheet between the first and second tapes to transport the sheet, and the rotary drum wraps therearound the sheet together with the first tape and the second tape.

9. A sheet storing device, comprising:

a rotary drum;

a tape to be wound on an outer circumferential surface of the rotary drum so as to wrap a sheet around the rotary drum;

a frame that is a casing of the sheet storing device, wherein the frame includes a first frame and a second frame, and the frame forms a space which accommodates the rotary drum; and an engagement support engaged with and turnably relative to the sheet storing device, wherein the first frame and the second frame are movably connected relative to each other to allow a transition between a closed state and an open state and fully envelop the rotary drum in the closed state, the closed state is a state in which the space is covered by the second frame and is not exposed, the open state is a state in which the space is not covered by the second frame and is exposed, the first frame includes a first wall, the second frame includes a second wall that has a plate shape and is turnably supported by the first frame, in the closed state, the second wall is opposed to the first wall, in the open state, the second wall is inclined at an inclination angle of 45 degrees or more and 90 degrees or less with respect to the first wall, and the tape moves in accordance with movement of the engagement support in the open state.

10. The sheet storing device of claim 9, wherein the engagement support is exposed to an outside of the sheet storing device in the open state.

11. The sheet storing device of claim 9, wherein the engagement support is a rigid body.

12. The sheet storing device of claim 9, wherein the first frame is larger than the second frame and includes a plurality of walls including the first wall, in the closed state, the rotary drum is enveloped by the plurality of walls of the first frame and the second wall of the second frame, and in the open state, the rotary drum is exposed from a region where the second wall of the second frame has been located in the closed state and is covered with the plurality of walls of the first frame.

13. The sheet storing device of claim 9, wherein a portion of the tape that is located in a region opposed to the second frame is inclined with respect to the second wall in the open state and is exposed outside the first frame, and the tape is connected to the rotary drum.

14. The sheet storing device of claim 9, further comprising:

an opening for taking the sheet from an outside to an inside of the sheet storing device; and a support shaft that supports the second frame turnably relative to the first frame, wherein a distance between the opening and the support shaft is larger than a distance between the rotary drum and the support shaft.

15. The sheet storing device of claim 14, wherein a distance between a reel that holds the tape and the support shaft is larger than a distance between the rotary drum and the support shaft.

16. The sheet storing device of claim 14, wherein a guide is provided at the opening, the guide protruding outward from the sheet storing device and being opposed to the tape.

* * * * *